US012496505B2

(12) United States Patent
Han et al.

(10) Patent No.: US 12,496,505 B2
(45) Date of Patent: Dec. 16, 2025

(54) BOXING TRAINING ROBOT WITH FEEDBACK FUNCTION

(71) Applicant: National Taipei University of Technology, Taipei (TW)

(72) Inventors: Ping-Hsuan Han, Taipei (TW); Chien-Hsing Chou, Taipei (TW)

(73) Assignee: National Taipei University of Technology, Taipei (TW)

( * ) Notice: Subject to any disclaimer, the term of this patent is extended or adjusted under 35 U.S.C. 154(b) by 77 days.

(21) Appl. No.: 18/630,037

(22) Filed: Apr. 9, 2024

(65) Prior Publication Data

US 2024/0342572 A1   Oct. 17, 2024

Related U.S. Application Data

(60) Provisional application No. 63/458,658, filed on Apr. 12, 2023.

(51) Int. Cl.
*A63B 69/20* (2006.01)
*A63B 24/00* (2006.01)
(Continued)

(52) U.S. Cl.
CPC .......... *A63B 69/20* (2013.01); *A63B 24/0006* (2013.01); *A63B 24/0062* (2013.01); *A63B 71/0622* (2013.01); *A63B 71/145* (2013.01); *G05D 1/24* (2024.01); *G05D 1/611* (2024.01); *A63B 2071/0638* (2013.01); *A63B 2071/0666* (2013.01); *A63B 2220/10* (2013.01); *A63B 2220/17* (2013.01); *A63B 2220/20* (2013.01);
(Continued)

(58) Field of Classification Search
CPC . A63B 69/20; A63B 24/0006; A63B 24/0062; A63B 71/0622; A63B 71/145; A63B 2071/0638; A63B 2071/0666; A63B 2220/10; A63B 2220/17; A63B 2220/20; A63B 2220/30; A63B 2220/62; A63B 2220/833; A63B 2244/102; G05D 1/24; G05D 1/611; G05D 2105/35
See application file for complete search history.

(56) References Cited

U.S. PATENT DOCUMENTS 11,992,746 B1 * 5/2024 Berme ............... A63B 22/0292
12,257,488 B1 * 3/2025 Marino ................ A63B 69/305
(Continued)

FOREIGN PATENT DOCUMENTS

| CN | 116036567 A | * | 5/2023 | .......... G02B 27/017 |
| KR | 20170032767 A | * | 3/2017 | ............ A63B 69/00 |
| WO | WO-2024250057 A1 | * | 12/2024 | ........ A63B 69/0053 |

*Primary Examiner* — Sundhara M Ganesan
(74) *Attorney, Agent, or Firm* — Troutman Pepper Locke LLP; Tim Tingkang Xia, Esq.

(57) ABSTRACT

Disclosed is a boxing training system with a feedback function, including a training robot, a boxing glove assembly and a virtual reality device. The training robot performs a displacement movement. The boxing glove assembly is located on a user's hand and hits the training robot. The virtual reality device is electrically connected to the training robot and the boxing glove assembly, respectively. The virtual reality device is located at the user's eyes and displays a virtual image. The virtual image has a virtual opponent and a virtual boxing glove. When the virtual boxing glove hits the virtual opponent, the boxing glove assembly just hits the training robot.

11 Claims, 3 Drawing Sheets

(51) Int. Cl.
  *A63B 71/06*    (2006.01)
  *A63B 71/14*    (2006.01)
  *G05D 1/24*     (2024.01)
  *G05D 1/611*    (2024.01)
  *G05D 105/35*   (2024.01)

(52) U.S. Cl.
  CPC ....... *A63B 2220/30* (2013.01); *A63B 2220/62* (2013.01); *A63B 2220/833* (2013.01); *A63B 2244/102* (2013.01); *G05D 2105/35* (2024.01)

(56) References Cited

U.S. PATENT DOCUMENTS

| | | | |
|---|---|---|---|
| 2010/0130333 A1* | 5/2010 | Strong | A63B 71/023 |
| | | | 482/83 |
| 2021/0197058 A1* | 7/2021 | Margareten | A63B 69/32 |
| 2023/0256297 A1* | 8/2023 | Canberk | G02B 27/017 |
| | | | 482/8 |
| 2024/0058648 A1* | 2/2024 | Olaoluwa | A63B 24/0062 |
| 2024/0108962 A1* | 4/2024 | Stout, Jr. | G06V 10/70 |
| 2025/0050189 A1* | 2/2025 | Morin | G06T 13/40 |

\* cited by examiner

BOXING TRAINING ROBOT WITH FEEDBACK FUNCTION

CROSS-REFERENCE TO RELATED APPLICATION

This application claims priority of U.S. Provisional Application No. 63/458,658, filed on Apr. 12, 2023, which is incorporated by reference herein in its entirety.

BACKGROUND OF THE INVENTION

Field of the Invention

The present invention relates to a boxing training robot, and in particular to a boxing training system with a feedback function utilizing an encounter-type tactile feedback technology that can perform positioning and orientation repeatedly.

Description of the Prior Art

In the training process of fitness enthusiasts and professional boxing athletes, training equipment such as boxing target equipment is often used. In the prior art, boxing target training equipment includes suspended-type and vertical-type. Suspended boxing target training equipment refers to equipment that hangs sandbags on roofs, walls or beams through ropes or chains. Alternatively, vertical boxing target training equipment refers to equipment in which the boxing target is installed on a load-bearing base and the load-bearing base stands on the ground. In the prior art, neither the hanging type nor the vertical boxing target training equipment has an automatic following function. Although there is movable suspended track-type boxing target training equipment among the existing suspended boxing target training equipment, it must be locked in the physical space (wall/ceiling). Additionally, for trainers, no matter what form of boxing target training equipment are, they can only practice footwork within a limited range of movement when boxing, therefore they cannot achieve realistic training effects. In addition, existing boxing target training equipment does not have the function of simulating the opponent's movement strategy and active attack, so it cannot effectively improve the level of trainers.

There is currently a boxing simulation robot that can simulate people's boxing and can also help people with boxing training. Such a boxing simulation robot has been widely used. However, with the rapid development of technology, people have more and more performance requirements for boxing simulation robots. Nowadays, the boxing simulation robot can complete many forms of operations and help people carry out boxing training.

However, traditional boxing simulation robots have a simple structure and a single function. In other words, existing boxing simulation robots have the disadvantage of insufficient humanization. In addition, robots with humanoid functions cannot achieve professional boxing training. Therefore, how to effectively imitate real-person boxing movements, improve athletes' defensive and attack training, and overcome the shortcomings of existing designs that are insufficient in human imitation has always been a subject of research and development by the industry.

SUMMARY OF THE INVENTION

In view of the foregoing shortcomings, one of the objectives of the present invention is to provide a boxing training robot with a feedback function and capable of withstanding hits. One embodiment includes a base, a structural claw, a water-air bag and a spatial tracking system, and is an encounter-type tactile feedback technology that can perform positioning and orientation repeatedly. The base in one embodiment can move in all directions and does not need to be installed in a physical space. The robot in one embodiment is capable of moving when it withstands the force of boxing, so that the boxer can be trained for punches and footwork at the same time. By using the virtual opponent to correspond to the training robot's situation, it can achieve an effect close to the real situation.

The present invention provides a boxing training system with a feedback function, including: a training robot that performs a displacement movement and withstands a blow; a boxing glove assembly that is located on a user's hand and hits the training robot; and a virtual reality device that is electrically connected to the training robot and the boxing glove assembly, respectively. The virtual reality device is located at the user's eyes and displays a virtual image. The virtual image has a virtual opponent and a virtual boxing glove. The boxing glove assembly just hits the training robot when the virtual boxing glove hits the virtual opponent.

Further, the training robot includes a movable base that is polygonal in shape, as well as a boxing water-air bag that includes a shock-absorbing structure and a water-air bag body. The movable base includes an accommodation base, a positioning device, a plurality of wheel bodies and a plurality of damping members. The accommodation base is located at a center of the movable base, and the wheel body is located on a bottom side of the movable base, so that the movable base is capable of performing the displacement movement. The positioning device detects a relative position of the displacement movement. One end of the damping member is connected to the movable base. The shock-absorbing structure is connected to the accommodation base. An outer edge surface of the shock-absorbing structure is connected another end of the damping member. The water-air bag body is connected to the shock-absorbing structure.

Further, the shock-absorbing structure is a bag-like structure containing a liquid and gas.

Further, the positioning device has a direction module and a position module, and a plurality of positioning totems disposed on the position module. The direction module detects a traveling direction of the relative position, and the position module detects a traveling position of the relative position. Additionally, it should be further appreciated that the terminology (e.g., totems) disclosed hereinafter and throughout this specification relate to feature point(s). The feature point(s) can be an image(s), an object(s), or feature points generated by IR light. Hereinafter and throughout this specification, tracking methodologies employed in various embodiments refer to inside-out tracking, outside-in tracking, or other virtual reality tracking methodologies.

Further, the training robot further includes a control device that is electrically connected to and enables the movable base to perform the displacement movement.

Further, the movable base has a wheel housing motor and a universal wheel. The wheel housing motor is activated to cause the movable base to perform the displacement movement. A movement of the universal wheel causes the movable base to adjust a direction of the displacement movement. The direction of the displacement movement is adjusted to forward, backward, left turn, right turn, translation, so that it rotates around the center of the movable base in a clockwise or counterclockwise manner.

Further, there are multiple cushion pads around an outer edge of the movable base.

Further, the virtual reality device is a head-mounted display and provides the user with visual and auditory feedback to simulate the appearance, reactions while hitting or being hit, visual special effects, sound effects from various virtual opponents in virtual reality or augmented reality as well as visual and auditory simulations of various training environments and off-field coaches.

Further, the boxing glove assembly has a positioning sensor that obtains hand movement trajectory information of the user to visualize the virtual boxing glove in virtual reality or augmented reality.

Alternatively, the boxing training system with a feedback function further includes a server that shares data and information with the virtual reality device through transmission of a wired signal or a wireless signal.

Further, the server records a direction, a position, and time of the hand and head of the virtual reality device and the user, as well as a direction, a position, and time of the training robot. The server calculates the user's punch speed, hit rate, and hitting reaction time, distance from the training robot.

DESCRIPTION OF THE PREFERRED EMBODIMENTS

In order to make the objectives, technical solutions, and advantages of the present invention clearer, the following describes the present invention in further detail with reference to the accompanying drawings and embodiments. It should be understood that the specific embodiments described here are only used to explain the present application, and are not used to limit the present invention.

First of all, it should be appreciated that the terminologies (e.g., position, positioning, positioning device, positioning module, and positioning sensor) disclosed hereinafter and throughout this specification relate to space, spatial tracking, spatial tracking device, spatial tracking module, spatial tracking sensor, and spatial tracking system.

Figure 1:
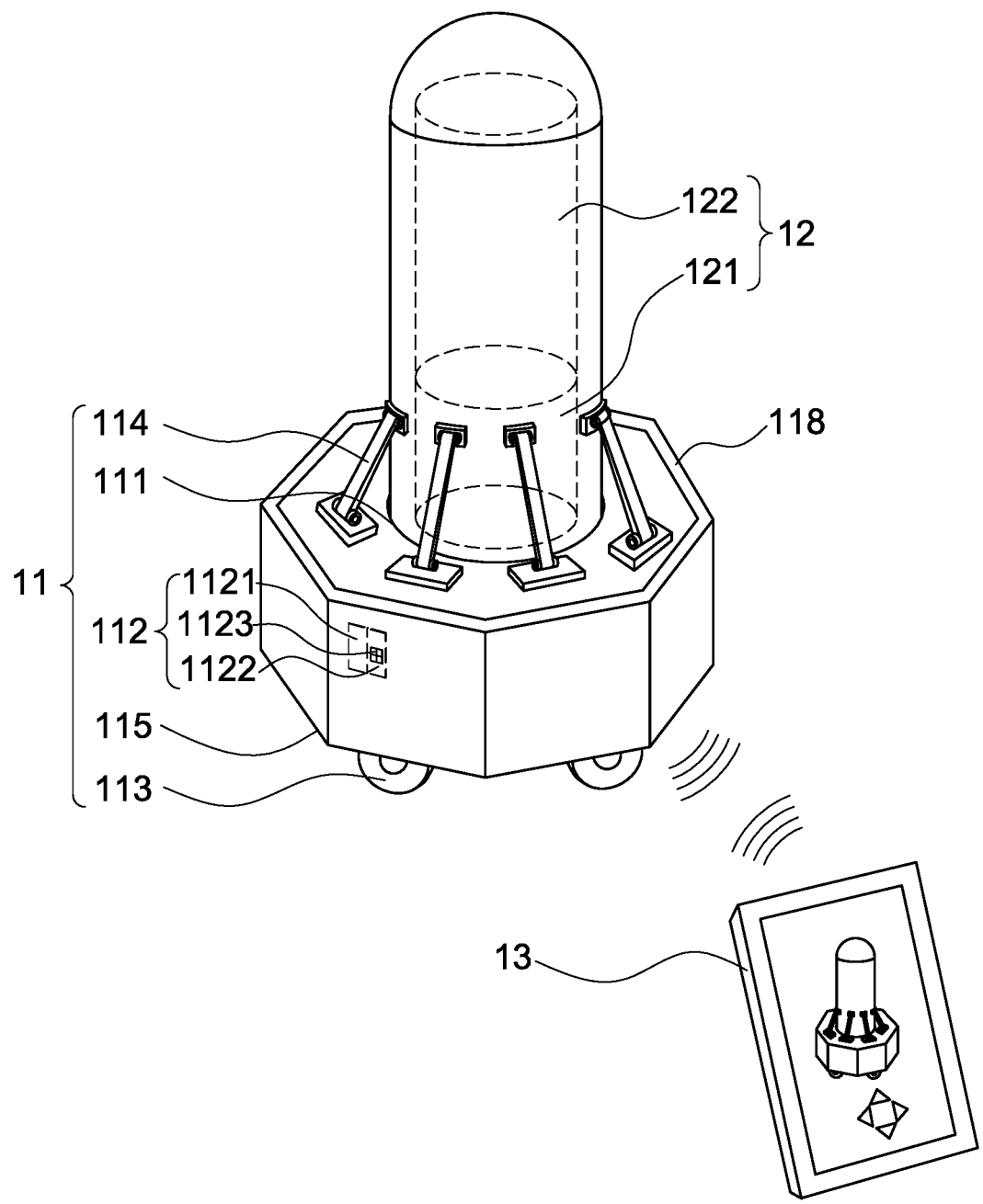
FIG. 1 shows a boxing training system with a feedback function of the present invention.
Figure 2:
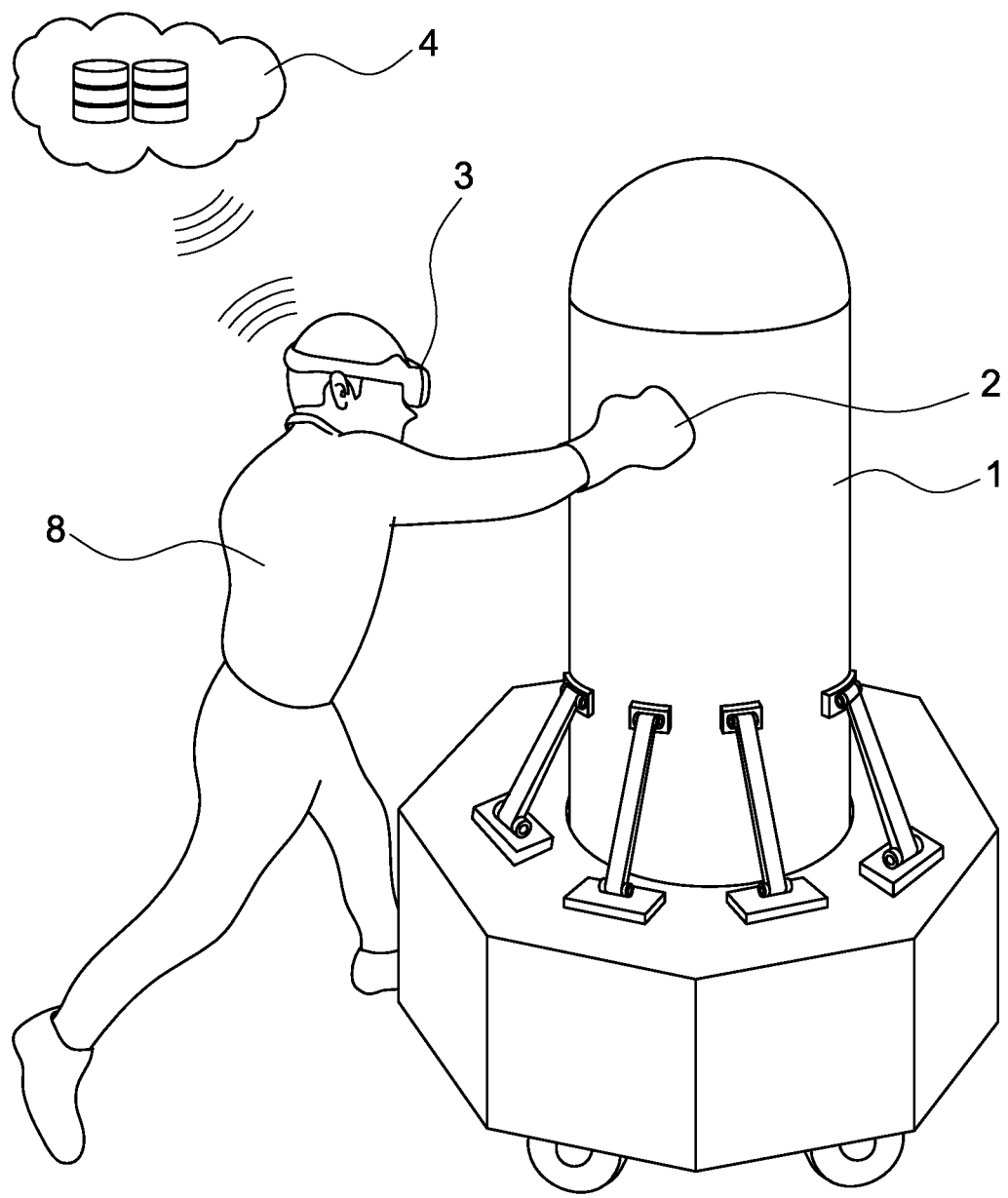
FIG. 2 shows a boxing training system with a feedback function in operation of the present invention.
Figure 3:
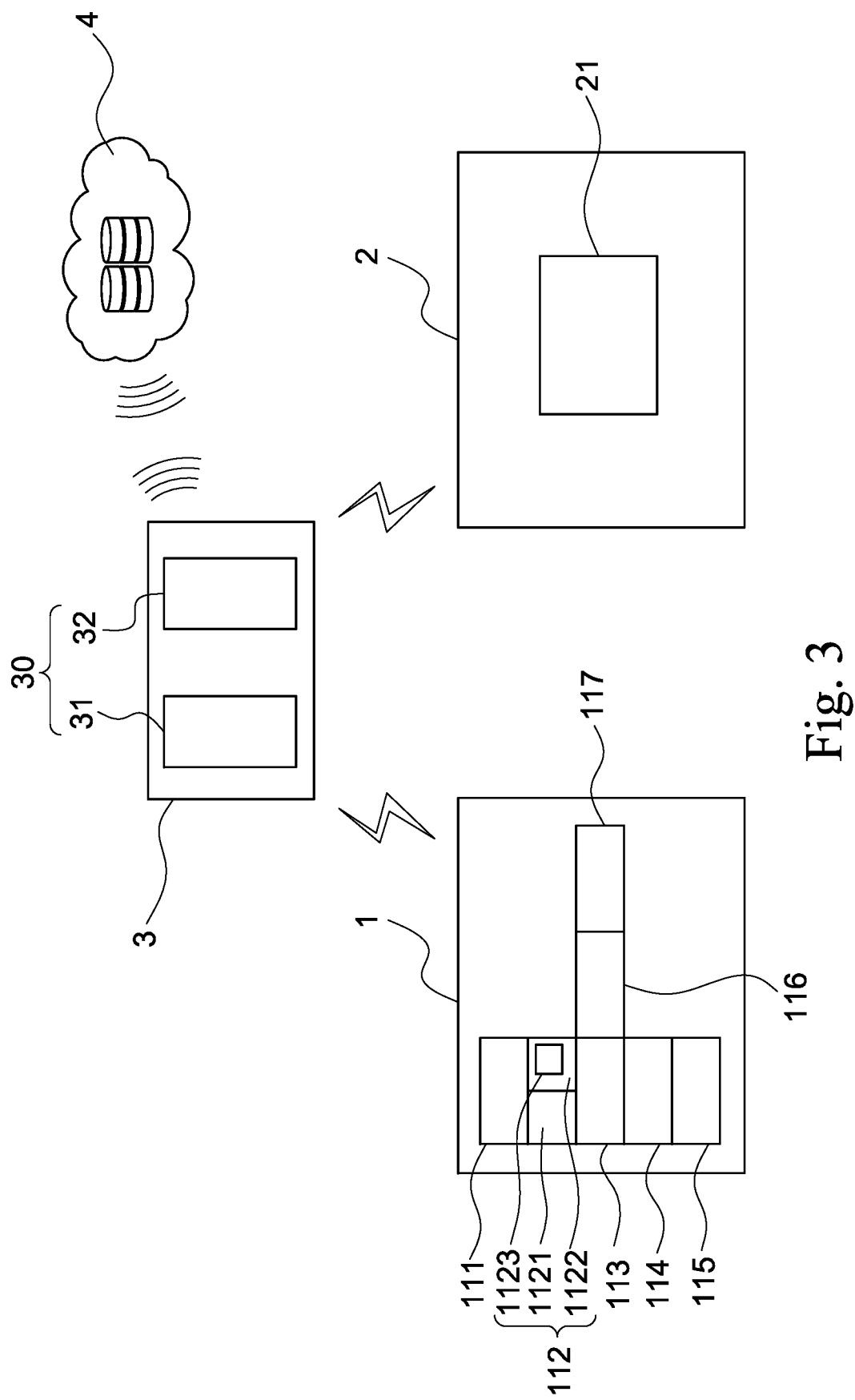
FIG. 3 depicts a block diagram of a boxing training system with a feedback function of the present invention.

Please refer to FIG. 1 to FIG. 3. FIG. 1 shows a boxing training system with a feedback function of the present invention. FIG. 2 shows a boxing training system with a feedback function in operation of the present invention. FIG. 3 depicts a block diagram of a boxing training system with a feedback function of the present invention. The present invention provides a boxing training system with a feedback function, including: a training robot 1, a boxing glove assembly 2, and a virtual reality device 3. The training robot 1 performs a displacement movement (not shown) and withstands a blow. The boxing glove assembly 2 is located on hands of a user 8 and hits the training robot 1. The virtual reality device 3 is electrically connected to the training robot 1 and the boxing glove assembly 2, respectively. The virtual reality device 3 is located at eyes of the user 8 and displays a virtual image 30. The virtual image 30 has a virtual opponent 31 and a virtual boxing glove 32. The boxing glove assembly 2 just hits the training robot 1 when the virtual boxing glove 32 hits the virtual opponent 31.

In one embodiment, the training robot 1 includes a movable base 11 and a boxing water-air bag 12 The movable base 11 is polygonal in shape. The movable base 11 includes an accommodation base 111, a positioning device 112, a plurality of wheel bodies and a plurality of damping members 114. The accommodation base 111 is located at a center of the movable base 11, and the wheel body 13 is located on a bottom side 115 of the movable base 11, so that the movable base 11 is capable of performing the displacement movement. The positioning device 112 detects a relative position (not shown) of the displacement movement. One end of the damping member 114 is connected to the movable base 11.

In one embodiment, the boxing water-air bag 12 includes a shock-absorbing structure 121 and a water-air bag body 122. The shock-absorbing structure 121 is connected to the accommodation base 111. An outer edge surface of the shock-absorbing structure 121 is connected another end of the damping member 114. The water-air bag body 122 is connected to the shock-absorbing structure 121. In one embodiment, the shock-absorbing structure 121 is a bag-like structure containing a liquid and gas. In doing so, the robot of one embodiment can bear greater hits.

In one embodiment, the positioning device 112 has a direction module 1121 and a position module 1122. The direction module 1121 detects a traveling direction of the relative position, and the position module 1122 detects a traveling position of the relative position. Additionally, a plurality of positioning totems 1123 are disposed on the position module 1122 so that the virtual reality device can detect the relative position. In one embodiment, the training robot 1 further includes a control device 13 that is electrically connected to and enables the movable base 11 to perform the displacement movement.

In one embodiment, the movable base 11 has a wheel housing motor 116 and a universal wheel 117. The wheel housing motor 116 is activated to cause the movable base 11 to perform the displacement movement. A movement of the universal wheel 117 causes the movable base 11 to adjust a direction of the displacement movement. The direction of the displacement movement is adjusted to forward, backward, left turn, right turn, translation, so that it rotates around the center of the movable base 11 in a clockwise or counterclockwise manner. In one embodiment, there are multiple cushion pads 118 around an outer edge of the movable base 11. In one embodiment, the wheel housing motor 116 o includes a McCann wheel.

In one embodiment, the virtual reality device 3 is a head-mounted display and provides the user 8 with visual and auditory feedback to simulate the appearance, reactions while hitting or being hit, visual special effects, sound effects from various virtual opponents 31 in virtual reality or augmented reality as well as visual and auditory simulations of various training environments and off-field coaches. In one embodiment, the boxing glove assembly 2 has a positioning sensor 21 that obtains hand movement trajectory information of the user 8 to visualize the virtual boxing glove 32 in virtual reality or augmented reality.

In one embodiment, the boxing training system with a feedback function further includes a server 4 that shares data and information with the virtual reality device through transmission of a wired signal or a wireless signal. Furthermore, the server 4 records a direction, a position, and time of the hand and head of the virtual reality device and the user 8, as well as a direction, a position, and time of the training robot. The server calculates the user's punch speed, hit rate, and hitting reaction time, distance from the training robot 1.

The above embodiments are only used to illustrate the technical solutions of the present invention and not to limit them. Although the present invention has been described in detail with reference to the preferred embodiments, those of ordinary skill in the art should understand that the technical solutions of the present invention can be modified or modified for equivalent replacements without departing from the spirit and scope of the technical solution of the present invention.

What is claimed is:

1. A boxing training system with a feedback function, including:
    a training robot that performs a displacement movement and withstands a blow;
    a boxing glove assembly that is located on a user's hand and hits the training robot; and
    a virtual reality device that is electrically connected to the training robot and the boxing glove assembly, respectively;
    wherein the virtual reality device is located at the user's eyes and displays a virtual image; wherein the virtual image has a virtual opponent and a virtual boxing glove; and wherein the boxing glove assembly just hits the training robot when the virtual boxing glove hits the virtual opponent.

2. The boxing training system with a feedback function according to claim 1, wherein the training robot includes:
    a movable base that is polygonal in shape, wherein the movable base includes an accommodation base, a positioning device, a plurality of wheel bodies and a plurality of damping members; wherein the accommodation base is located at a center of the movable base, and the wheel body is located on a bottom side of the movable base, so that the movable base is capable of performing the displacement movement; wherein the positioning device detects a relative position of the displacement movement; and wherein one end of the damping member is connected to the movable base;
    a boxing water-air bag that includes a shock-absorbing structure and a water-air bag body, wherein the shock-absorbing structure is connected to the accommodation base; wherein an outer edge surface of the shock-absorbing structure is connected another end of the damping member; and wherein the water-air bag body is connected to the shock-absorbing structure.

3. The boxing training system with a feedback function according to claim 2, wherein the shock-absorbing structure is a bag-like structure containing a liquid and gas.

4. The boxing training system with a feedback function according to claim 2, wherein the positioning device has a direction module and a position module, and a plurality of positioning totems disposed on the position module; and wherein the direction module detects a traveling direction of the relative position, and the position module detects a traveling position of the relative position.

5. The boxing training system with a feedback function according to claim 2, wherein the training robot further includes a control device that is electrically connected to and enables the movable base to perform the displacement movement.

6. The boxing training system with a feedback function according to claim 2, wherein the movable base has a wheel housing motor and a universal wheel; wherein the wheel housing motor is activated to cause the movable base to perform the displacement movement; wherein a movement of the universal wheel causes the movable base to adjust a direction of the displacement movement; and wherein the direction of the displacement movement is adjusted to forward, backward, left turn, right turn, translation, so that it rotates around the center of the movable base in a clockwise or counterclockwise manner.

7. The boxing training system with a feedback function according to claim 2, wherein there are multiple cushion pads around an outer edge of the movable base.

8. The boxing training system with a feedback function according to claim 1, wherein the virtual reality device is a head-mounted display and provides the user with visual and auditory feedback to simulate the appearance, reactions while hitting or being hit, visual special effects, sound effects from various virtual opponents in virtual reality or augmented reality as well as visual and auditory simulations of various training environments and off-field coaches.

9. The boxing training system with a feedback function according to claim 8, wherein the boxing glove assembly has a positioning sensor that obtains hand movement trajectory information of the user to visualize the virtual boxing glove in virtual reality or augmented reality.

10. The boxing training system with a feedback function according to claim 1, further including a server that shares data and information with the virtual reality device through transmission of a wired signal or a wireless signal.

11. The boxing training system with a feedback function according to claim 10, wherein the server records a direction, a position, and time of the hand and head of the virtual reality device and the user, as well as a direction, a position, and time of the training robot; and wherein the server calculates the user's punch speed, hit rate, and hitting reaction time, distance from the training robot.

* * * * *